July 1, 1930.  E. W. ORTON  1,769,386
GATE VALVE
Filed Oct. 17, 1927
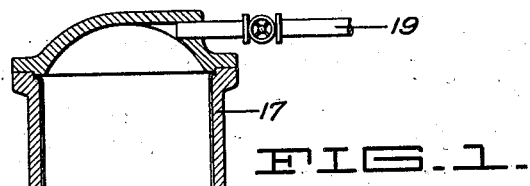
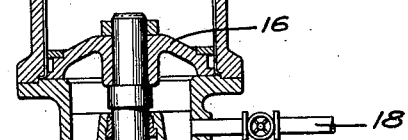
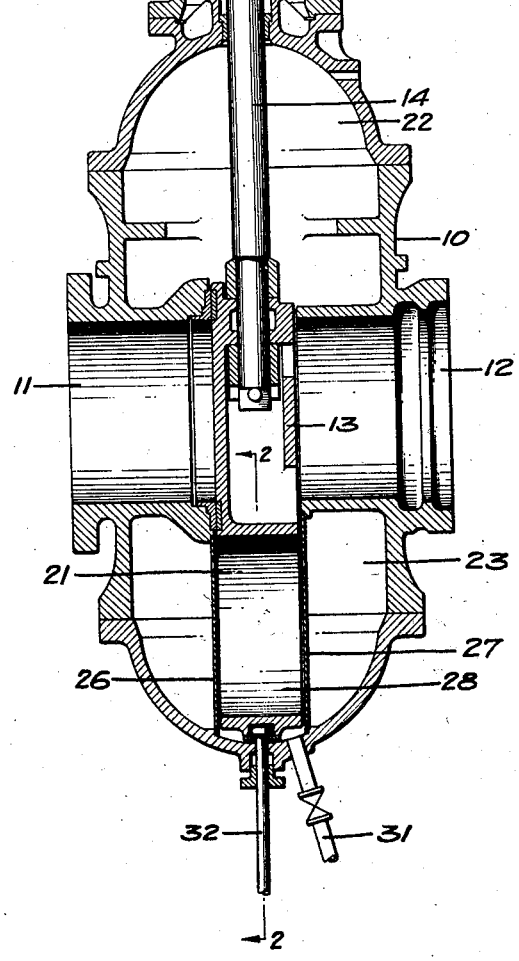
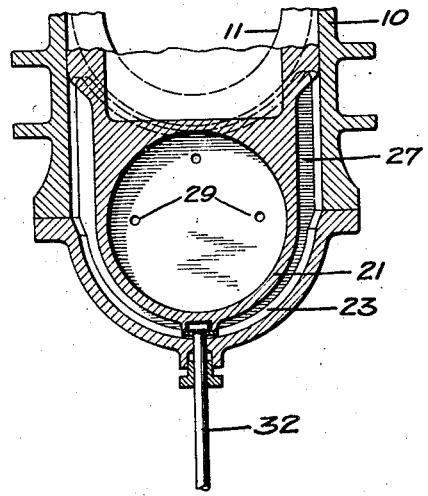
INVENTOR
Ernest W. Orton
BY
White, Prost & Fryer
ATTORNEYS Patented July 1, 1930

1,769,386

UNITED STATES PATENT OFFICE

ERNEST W. ORTON, OF MOUNTAIN VIEW, CALIFORNIA, ASSIGNOR TO THE PELTON WATER WHEEL COMPANY, OF SAN FRANCISCO, CALIFORNIA, A CORPORATION OF CALIFORNIA

GATE VALVE

Application filed October 17, 1927. Serial No. 226,621.

This invention relates generally to the construction of hydraulic valves of the gate type.

In the construction of gate valves, it is desirable to utilize a follower ring which is attached to the lower end of the valve disc so as to follow up and take the position occupied by the disc when the valve is opened. A follower ring of this kind is desirable as it provides a smooth continuous bore for the flow of water passing thru the valve, thus minimizing losses and disturbances due to turbulence. It also provides a means for protecting the valve seat when the valve is open and the disc is within the valve body. With certain systems with which these valves are employed, as for example for controlling flow of water thru penstocks, a certain amount of abrasive and foreign material such as rocks, pebbles, silt and the like, may be washed thru the valve. In case of ordinary valve constructions such as have been used in the past, foreign material of this kind frequently lodges between the follower ring and the immediately surrounding parts of the gate body, thus rendering the valve inoperative. While the follower ring may be discarded in installations where the water flow is not of high velocity, it is especially desirable where valves are being operated against high water heads, as in the construction of modern hydro-electric plants.

It is therefore an object of this invention to devise a gate valve which will incorporate the inherent advantages of a gate valve of the follower ring type but which will not be subject to clogging by foreign solid material.

It is a further object of this invention to incorporate means in the valve body of a gate valve of the follower ring type which will prevent the accumulation of foreign material beneath the follower ring.

Further objects of this invention will appear from the following description in which I have set forth the preferred embodiment of my invention. It is to be understood that the appended claims are to be accorded a range of equivalents consistent with the state of the prior art.

Referring to the drawing:

Figure 1 is a side elevational view in cross section showing a gate valve constructed in accordance with this invention.

Fig. 2 is a detail in cross section taken along the line 2—2 of Fig. 1.

The invention may be outlined briefly as comprising a valve of the gate type in which a follower ring is attached to the lower portion of the valve disc. When the valve is in closed position, the follower ring is positioned within a portion of the valve body. To prevent accumulations of foreign material beneath the follower ring, I provide fixed walls within the valve body and which are positioned adjacent opposite sides of the follower ring. These walls are preferably perforated so that water may flow into the spaces immediately surrounding the walls and thus equalize stresses upon the same.

Referring to the drawing for a detailed description of this invention, I have shown a valve of the gate type comprising a body 10 having a discharge opening 11 and an inlet opening 12. Slidably disposed within the body there is a valve disc 13 which may be actuated either manually or by motive means. In the specific embodiment illustrated I have shown a hydraulic cylinder and plunger by means of which the disc 13 may be moved from open to closed position. Thus disc 13 is shown as connected to an actuating rod 14, which in turn is connected to a hydraulic piston 16. Piston 16 is cooperatively disposed within a suitable hydraulic cylinder 17, which is in communication with a controlled supply of fluid pressure as by means of pipes 18 and 19. Connected to the lower portion of the disc 13, there is a follower ring 21 which is adapted to take the place of the disc 13, when the valve is in open position.

The valve body is preferably constructed so as to provide upper and lower connected chamber portions 22 and 23, chamber portion 22 serving to receive the disc 13 when the valve is in open position, and portion 23 serving to receive the follower ring when the valve is closed. With the construction in so far as it has been described, when the valve is in an intermediate position between open and closed positions, chamber portion 23 is in communication with the inflow side of the valve thru the follower ring 21, and therefore rocks, pebbles, silt, or other foreign matter may enter the chamber portion 23 and deposit below the follower ring 21. Deposits of this sort are frequently sufficient to prevent the follower ring from moving downwardly to its accustomed position and thus render the valve inoperative. To prevent these accumulations of foreign material below the follower ring, I provide spaced parallel walls 26 and 27 within the chamber portion 23. These walls are mounted in close proximity to the opposite sides of follower ring 21 and serve to form a pocket 28 of sufficient width to receive the ring 21. Walls 26 and 27 are positioned sufficiently close to the sides of the follower ring that passage of foreign solid material below the follower ring is prevented.

Walls 26 and 27 may be constructed of sufficient thickness and strength to withstand the pressure of water upon the inflow side of the valve. However I prefer to construct these walls of relatively light material and to equalize the pressures upon opposite sides of the same. Equalization of pressure in this instance may be accomplished by establishing communication between the pocket 28 and that portion of chamber portion 23 surrounding the walls 27. For this purpose I have shown one or more perforations 29 in the walls 26 and 27, these perforations being sufficiently large to permit flow of fluid to the chamber portion 23, but being insufficient in diameter to prevent the passage of solid foreign matter. Chamber portions 23 may also be provided with a pipe connection 31 to permit drainage of the chamber portions 22 and 23, or to permit flushing of the same by an external source of pressure. Follower ring 21 may also be connected with a rod 32 for manual operation of the valve or actuating another mechanism upon opening and closing of the gate valve.

The operation of the invention is obvious from the above description. Assuming that the valve is open and the follower ring 21 is in alinement with the intake and discharge openings 12 and 11, if the valve is now moved toward closed position, solid foreign material upon the inflow side cannot pass the lower portion of the follower ring 21 and therefore cannot be deposited below this ring to prevent full movement of the valve disc to closed position. Any foreign material which may accumulate within the follower ring while the valve is being moved to closed position, will be removed when the valve is again opened.

I claim:

1. In a hydraulic gate valve, a valve disc movable from open to closed positions, a follower ring secured to said disc, a hollow body adapted to form a chamber for receiving said ring when the disc is in closed position, and spaced walls disposed within said chamber to form a pocket of sufficient width to receive said ring but to prevent entrance of foreign solid material below the ring, said walls extending entirely across the faces of the ring when the valve disc is in its lowermost position, said pocket being in communication with the remainder of the chamber to equalize pressure upon the walls.

2. In a hydraulic valve, a valve disc movable from open to closed positions, a follower ring secured to said disc, a hollow body adapted to form a closed chamber for receiving the disc when in open position and the ring when in closed position, and spaced parallel walls positioned within said chamber to form a pocket to receive the ring but to prevent solid foreign material from passing past the ring, said walls extending entirely across the faces of the ring when the valve disc is in its lowermost position.

3. In a hydraulic valve, a valve disc movable from open to closed positions, a follower ring secured to said disc, a hollow body adapted to form a closed chamber for receiving the disc when in open position and the ring when in closed position, and spaced parallel perforate walls positioned within the chamber to form a pocket to receive the ring, said pocket being of such width as to prevent passage of solid foreign matter past the ring, said walls extending entirely across the faces of the ring when the valve disc is in its lowermost position.

In testimony whereof, I have hereunto set my hand.

ERNEST W. ORTON.